March 30, 1943.  D. R. YARNALL  2,315,238
INDICATOR GAUGE CONSTRUCTION
Filed Aug. 3, 1939  3 Sheets-Sheet 3
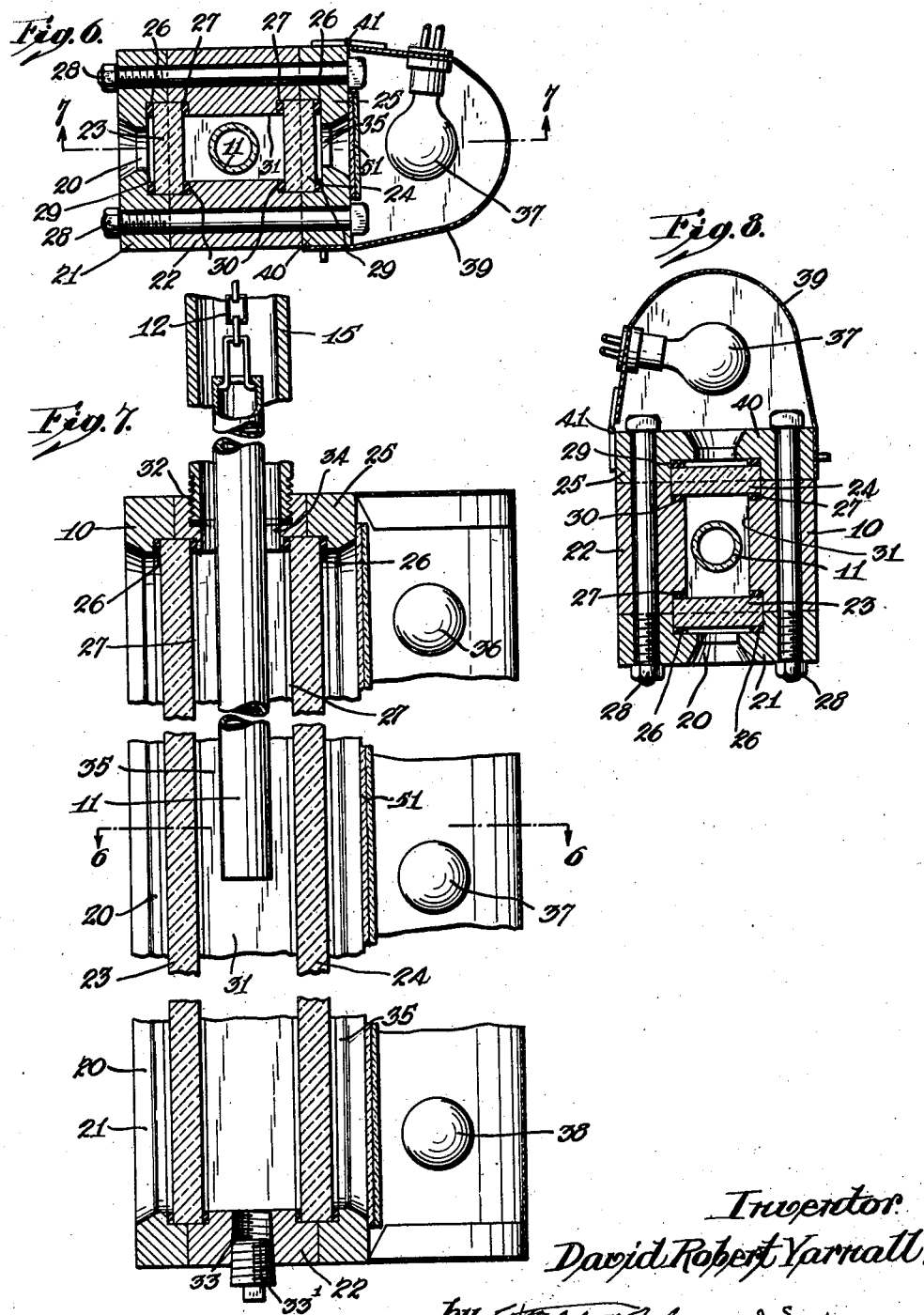

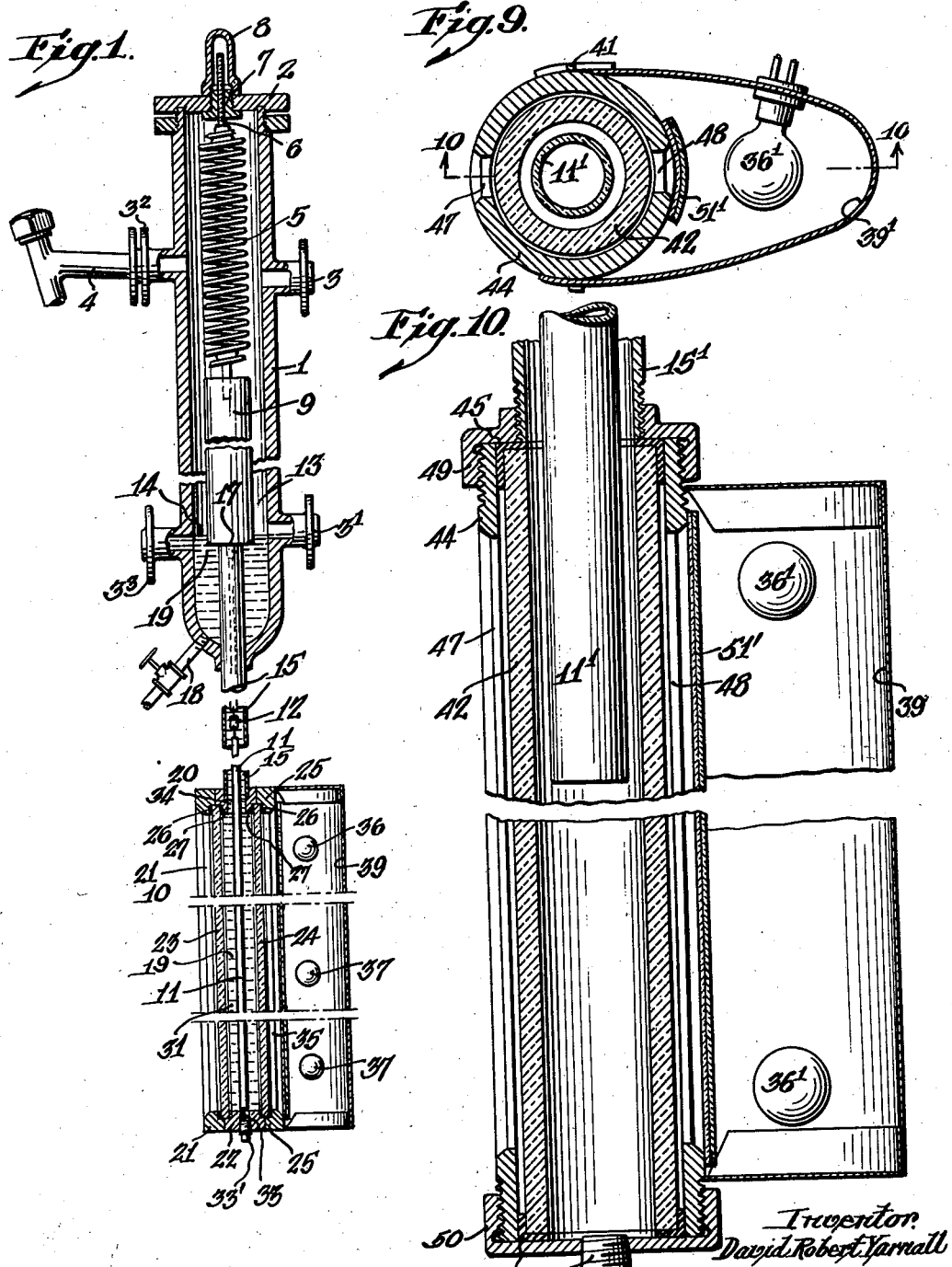

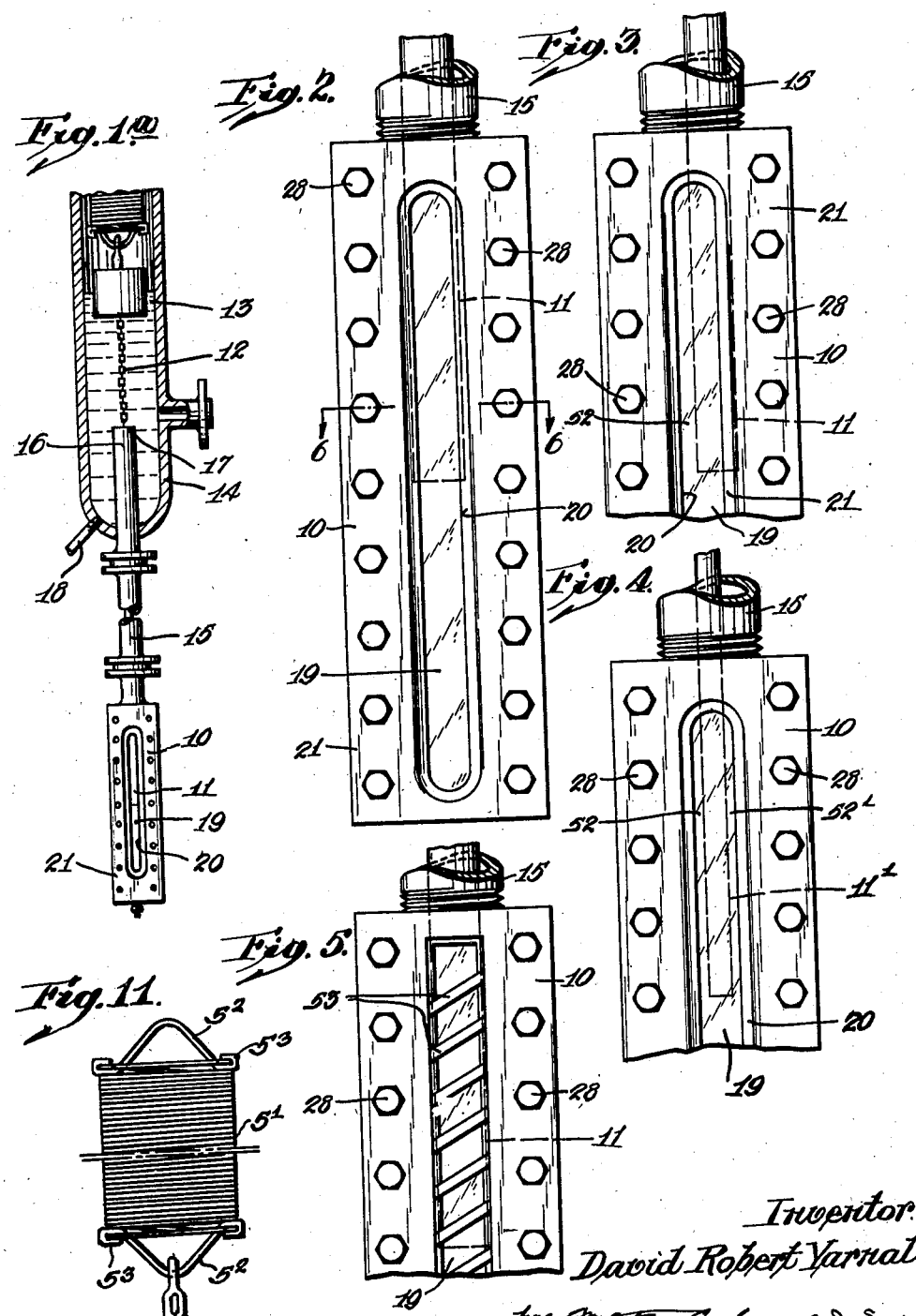

Patented Mar. 30, 1943

2,315,238

UNITED STATES PATENT OFFICE 2,315,238

INDICATOR GAUGE CONSTRUCTION

David Robert Yarnall, Philadelphia, Pa., assignor to Yarnall-Waring Company, Philadelphia, Pa., a corporation of Pennsylvania Application August 3, 1939, Serial No. 288,230

15 Claims. (Cl. 73—293)

My present invention relates to water level gauges of the general type broadly disclosed in my U. S. Patent No. 1,933,132, dated May 28, 1931. In this type of gauge the water level within an elevated float compartment is shown by the height of a submerged target hanging from the elevated float, and adapted to be read at any desired distance below the float. The submerged target lies within a water column and is read through suitable transparent walls adjacent to a scale. These gauges have wide application to indicate boiler water levels within eye line vision of boiler room attendants. In the past the targets have been of opaque material—usually of metal, or if of translucent material have had opaque cores.

My invention is splendidly adapted to support a target from a float which is centered in the float chamber, i. e. is kept from lateral movement and the entire float unit is free from sliding friction such as side wall engagement with the supporting mechanism, the float or the target.

The invention is directed in part to such center support and freedom from side wall friction.

In all types of gauges for indicating the water level in boilers, the problem of emphasizing the target position is a serious one. Even with low pressure there is considerable premium upon clearness of water indication. High pressures in the boiler systems have required thick, flat gauge glasses heavily protected by metal casings and the space exposed to the view is extremely narrow. The consequent narrowing of the exposure of the target to view has greatly increased the importance of having as good a contrast as possible between the target and the water space of the water gauge, whether it be at sight level or otherwise located.

One phase of the invention has been directed to the provision of a target capable of use below or above a float in any sight gauge and in which the contrast of the target, if below, with the water in the water space of the gauge is a maximum. Since the invention relates also to the target and provision for emphasis of the contrast between it and the water, such a target is capable of support by or from any type of float mechanism, including, for example, the float shown in my said Patent No. 1,933,132 or that in an application for Spring-supported solid float indicator, Serial No. 146,177 filed June 3, 1937.

One of the purposes of the invention is elimination of sliding friction, particularly with delicately balanced target center support such as in my application above.

In a sight level auxiliary gauge another purpose of the invention is to provide a translucent and preferably transparent colored gauge target and to illuminate it by transmitted light.

A further purpose is to use a colored clear tube or rod for a gauge target which shall be in sharp color contrast to the color of the water, and to pass through the target for illuminating purposes light containing the same color as the target.

A further purpose is to provide a colored transparent tube or rod as the gauge target and to pass diffused light to it, permissibly through a colored screen which passes the color of the target and at the same time gives the water a color distinguishing from the target.

A further purpose is to provide a translucent and preferably transparent gauge target and to illuminate the body of the target by light, most desirably by diffused light, containing the color of the target.

A further purpose is to facilitate vertical movement of the target by permitting flow of water through the target.

A further purpose is to show in close contrasting proximity a translucent and preferably transparent colored target of a color sharply distinguished from that of the water of the gauge and the water itself and to pass light of the same color as the target through the body of the target with or without further emphasizing the water and target contrast by coloring the water.

A further purpose is to make the target of material selectively transparent and opaque to different color rays and rearwardly to illumine the target and water adjacent the target with mixed color diffused rays of which different color portions are rays to which the target is respectively transparent and opaque, whereby the rays respectively transmitted through the body of the target and water present strong color contrast.

A further purpose is rearwardly to illumine a target of material, transparent to some and opaque to others respectively, of the rays presented and also to illumine water adjacent the target from the same light, for greater contrast passing it through a ground or frosted glass and/or—and it may be the same glass—a colored screen adapted to transmit mixed rays of the different colors to some of which the target is transparent and to other of which it is opaque, whereby the water receives and transmits diffused light and/or mixed color rays from the screen and transmits light in strong and illumined contrast to the color of the target.

A further purpose is to relate the diameter or thickness of a target, selectively transparent to some and opaque to other rays of different color, to the cross-section of the gauge, so that there will be no sliding friction and to the width of opening in front of the target whereby the target fills all or a portion only of the width of the opening, whereby the contrasting colors of the target and water may appear at the lower end only of the target or also along either or both sides of the target adjacent the corresponding side of the said opening.

A further purpose is to provide for the display of a very wide colored target by the use of a transmitted light through the body of the target across a correspondingly wide front cover opening with vertically spaced diagonal ribs across the opening to support the glass in front of the contrastingly colored target and water.

A further purpose is to provide a translucent or transparent colored target having a length comparable with the length of fluctuation of the target.

Further purposes will appear in the specification and in the claims.

I have elected to show one main form only of my invention, with a few modifications thereof, selecting however a main form and modifications thereof that are practical and efficient in operation and which illustrate particularly well the principles involved.

Figure 1 is a broken front elevation largely in central vertical section intended to illustrate conventionally structure embodying a desirable form of the device.

Figure 1a is an elevation largely in vertical section showing a slight modification of the structure of Figure 1.

Figures 2, 3, 4 and 5 are fragmentary enlarged views corresponding in general to portions of Figure 1 but showing somewhat different forms.

Figure 6 is a transverse section of Figure 2 and Figure 7 taken upon the line 6—6 thereof in the direction of the arrows.

Figure 7 is a broken vertical section of Figure 6 taken upon the line 7—7 thereof.

Figure 8 is a transverse section corresponding generally to Figure 6 but showing a somewhat different form.

Figure 9 is a transverse section corresponding generally to Figures 6 and 8 but showing a different form.

Figure 10 is a broken vertical section of Figure 9 taken upon the line 10—10 thereof.

Figure 11 is an enlarged side elevation of a spring.

Like numerals refer to like parts in all figures.

The present application is a continuation in part of my application for Indicator gauge construction, Serial No. 213,768, filed June 15, 1938.

Describing in illustration and not in limitation and referring to the drawings:

In Figure 1 the normal water column 1 is suitably flanged and is closed at the top by a flange cap 2 bolted thereto, the joint being protected by suitable packing.

Steam and water connections are shown at 3 and 3' and corresponding connections $3^2$ and $3^3$ are shown for an auxiliary water level gauge 4 of any suitable type, of which a fragment only is shown.

A spring 5 is supported at its upper end by a rod 6 threading into a nut 7 and covered by a cap 8. The lower end of the spring is connected with a float 9 by which the target 11 is supported in a casing 10. The target is connected by a flex- ible connection such as chain 12 with the float 9.

The spring is preloaded, as for example by winding each turn from stock which is held diagonally across the preceding turn during the winding so as to press each succeeding turn initially against the preceding turn to an extent depending upon the character and the thickness of stock, the winding tightness and the angle which the stock makes with the last preceding turn as the stock is wound. Preloading greatly reduces the extension of the spring in use and greatly reduces the column length required. Without it there would be difficulty in installing the device within the normal headroom available.

The preloading is selected so as to take care of the weight of the solid float and its suspension, including the target when the water is at maximum height. It also takes care of the layers of the spring progressively. The weight of the spring below each turn in question is taken care of; with the purpose and result that at top water level each turn of the spring will be in engagement with the next and with very slight downward movement of the float due to fall of the water level, the turns will begin to open each from the other, from one end of the spring to the other.

I have had very excellent success with soft springs of flat Inconel (13 Cr, 79.5 Ni and 6.5 Fe) having 120 turns to 135 turns, each turn of $2\frac{5}{16}$ outside diameter, approximately $1\frac{5}{16}$ inside diameter and .056" (axial) thickness.

Such a spring 5' is seen in Figure 11 where connection to the adjacent members is made by yokes $5^2$ whose ends embrace the strip of the spring at $5^3, 5^3$.

A long solid float is used for widely variant water levels as in Figure 1 and a short solid float is used where but slight variation in water level need be taken care of. The same supporting spring will take care of constructions having considerable difference in solid float length provided the longer solid float be of smaller diameter than the shorter solid float.

In the present invention both floats in Figures 1 and 1a are intended to be suspended from preloaded springs and in their suspension are centered so as to maintain the vertical position of the flexible cord or chain 12 and of the target 11 suspended from it; whereby the spring, solid float, target and suspension are all kept in line, avoiding contact with the surrounding casing and freeing the entire length from engagement with the sides of the column, casing and gauge glass, freeing thus from all sliding friction.

In this construction the entire suspension to and including the target moves without other friction than fluid friction and the friction inherent to the opening and closing of the respective turns of the spring away from and toward each other. Whereas the sliding friction avoided is greatest at the beginning of motion and therefore is particularly objectionable, fluid friction is zero until motion actually begins and is extremely low thereafter. The freedom from sliding friction is therefore particularly well suited to delicate suspensions of the character seen in Figures 1 and 1a where the turns of a spring sustain a not inconsiderable weight before releasing and the relations of the sustaining powers of individual turns, due to preloading are such that with lowering of the water from a position above high water level where theoretically the turns would begin to separate, one from the next at the same time from top to bottom of the spring if the weight were lengthened. This position is selected so that extra high water levels are taken care of. In use adjoining turns never quite touch each other but with lowering levels the turns separate uniformly from top to bottom.

The difference in weight between the parts at high water level and hence at maximum float immersion as compared with the total weight of the parts is desirably made as much as possible. For this reason an aluminum alloy is used, encased in a corrosion resisting shell. A solid carbon weight also has proved to be acceptable.

While the float 9 and float compartment 13 are intended to be any float responding to the liquid level 14 within any compartment, it will be more usually the float of a boiler level water-and-steam column such as is operatively connected to a water level indicator. The float usually is made of solid metal and is upwardly counterbalanced to adapt it to follow the water surface up and down with the rise and fall of water within the float compartment.

The gauge casing 10 and piping 15 between the gauge and float compartment are in effect a downwardly extending well connecting with the float compartment. The target 11 depending from any float 9 is thus submerged in water filling the casing 10 and piping 15 at the pressure of the float compartment, i. e., at boiler pressure. The piping 15 as shown opens upwardly at 16 into the float compartment at a point 17, preferably well above the bottom of the float compartment. A drain plug is indicated at 18.

By the aid of illumination from the rear and of rear and front transparent wall sections the gauge discloses the lower portion of the target 11 and water 19. The target has considerable length. It is preferably as long as is the range of movement of the target between high and low water positions. The water 19 shows beneath and optionally shows through the glass also along one or both sides of the target. The water is shown in Figure 1 and omitted in all other figures.

The target and water are both made visible through a slot 20 in a front cover plate 21.

No invention is claimed for the gauge casing as the invention is independent of its detail and would operate with any gauge structure having room for the target and capable of illumination through the target. However, since it is illustrated it will be described.

As illustrated in Figures 1-6 the gauge is a composite plate structure of the general type shown in U. S. patents to Aicher No. 1,954,466 and Yarnall No. 1,992,455. It includes a main body 22 of metal, front and rear glass closures 23 and 24, front and rear metal cover plates 21 and 25 and gaskets 26 and 27. Bolts 28 compress the plate members together upon the intermediate gaskets. The body and cover plates are reversely recessed at 29 and 30, respectively to seat the glass plates upon gaskets 27. The body for the major portion of its length is provided with a rear to front through opening 31, and at its upper and lower ends is bored and tapped at 32 and 33 to receive the pipe 15 and drain plug 33'.

The target 11 passes freely through an opening 34 large enough to ensure space about the target chain so that the depending flexible support and target may be free from engagement with fixed parts. The target thus extends into the water 19 within gauge space 35 where it hangs between vertical slots 20 and 35 of the front and rear cover plates. The target is illuminated by any desired number of lights 36, 37 and 38 which lights preferably are mounted on the wall of a reflector 39 formed to direct the light rays through the slot opening of the rear cover plate 25.

As illustrated the reflector is intended to be hinged at 41 to the rear cover plate so that it may be opened for easy access for insertion and removal of the lights.

Usually gauges of metal frame and heavy plate glass are used in view of the severe service conditions of present boiler room practice, but my present invention is not limited to the structure of the gauges, which may be of other shape and structure as high boiler pressures or low pressures require.

In the gauge of Figures 9 and 10 the target 11' extends downward into a heavy glass tube 42 dimensioned to withstand the pressure of the float compartment.

The gauge glass 42 is mounted inside a metal pipe or tubular casing 44 with which it is circumferentially sealed at top and bottom by gaskets 45 and 46. The casing 44 is slotted front and rear at 47 and 48 along an intermediate major portion of its length. The casing threads into top and bottom caps 49 and 50. As shown the top cap 49 is bored and tapped to receive the lower end of the pipe 15' leading from the float compartment; and the lower cap is bored and tapped to receive the drain plug 33'.

Plenty of lateral space for the spring, the float, the target and the suspending cord is provided so as to avoid side friction.

A reflector 39' carrying any proper number of lights 36' to illumine the target and water through the rear slot of the main tube is intended to be illustrated conventionally, hinged at 41 to the main pipe or casing, for easy access to the interior of the reflector.

The structural gauge features thus far described except for care to avoid lateral friction are intended for a conventional illustration of gauge structure of the prior art.

In the prior art the target has been made of opaque material—usually metal with water closely adjacent at the bottom—or of a rod core with a colored glass sleeve about it of length approximating its diameter and spaced from the water at the bottom and above by opaque sleeves. When the gauge has been illuminated from the rear the target has appeared to be unilluminated and substantially black, or illuminated at the sides about the core only. The water beneath the opaque target or beneath the opaque sleeve at the bottom of the target has been illuminated by the composite color of the light but there has been no contrast of adjacent water with an illuminated colored target.

I have found that the gauge indications are very much more readily apparent if the target, hitherto opaque or with a rod core and therefore appearing black from the front or illuminated at the sides only, be given a striking color; that this can be done by coloring the body of the target, making it transparent and illuminating it by rays which bring out its color; and by giving it a length many times its diameter and preferably such that it shall extend from the lowest point of intended indication to the top of the sight opening of the gauge and that the effect is greatly enhanced by illumination, with or without special contrasting coloring, of water closely adjacent to the colored target.

The target may be made transparent to some rays only of the illumination in order that the illuminations of the target and water may be in sharp color contrast.

I find glass and transparent plastics particularly suited to my purpose and therefore prefer to make the body of the target of tubular glass or of solid rod plastic, colored, as, for example, of ruby color, in that the body of the target, then transparent to rays of its own color, and in the main opaque to rays of other colors, shows up as viewed from in front of the gauge a strong illuminated red when illuminated from the rear with any light containing sufficient red rays, whether or not such rays to which the target is transparent are mixed with other rays to which the target is opaque. When there is an intermixture of the rays, those which are unable to pass through the target as well as those which would pass through the target except that they strike the water instead of the target, are used to illuminate the adjacent water differently than the target and add to the contrast.

If a maximum contrast between the target and the water be desired, the character of light by which the illumination is produced should be selected with this particularly in mind. This can be done best by passing the light through a screen—such as a green screen—which will not interfere with the passage of suitable rays for illumination for the target—such as a red target—but which will give a color to the water more sharply contrasting with the illuminated target than would be the contrast if the screen be not used.

In Figures 6 and 7 a screen 51 is shown, intended for the purpose of diffusing the light as with ground glass or etched glass or of filtering out certain rays of light in order to control the color of illumination of the water but without interfering with passage through the screen of the rays depended upon for illumination of the target. Where both diffusion and color screening are desired I prefer to accomplish both by the same screen. Even without a color screen the contrast between the water and the target is very marked. It will be evident that one or other of the gauge glasses 23 or 24 could be colored or given a diffusing surface or both for the same purpose or purposes.

Figure 8 is intended to illustrate that the light screen for coloring the water may be effected by suitably coloring one or both of the glass plates 23 and 24, either for example to be colored green without affecting the red of the target in that the green is a mixed color light that includes red light.

Either the gauge glass or the screen or both may be relied upon to filter out undesirable rays; or one can filter and the other diffuse. The availability of two "screen" materials makes it possible to eliminate one set of rays by one screen and another set by the other "screen."

Though the best results are to be obtained by imposing a contrasting color upon the water to throw an illuminated target into relief, very good contrast is effected between an illuminated red transparent target, for example, either solid or tubular and water which is not colored but is merely illuminated.

The effective contrast between an illuminated target and the natural illumination of the water by the light below the target is not limited to a red target, strong contrast being obtained also by a blue—cobalt blue, for example—or a dark green.

In considering the question of whether contrasting artificial color illumination of the water is to be used or not, it must be remembered that the use of a screen whose color is to be imposed upon the water reduces the brilliancy of the target color. Where no color screen is used the target more clearly and more brilliantly shows its true color than where a screen is used, reducing somewhat the illumination of the target as well as altering its color by juxtaposition of the two colors thrown into relief. With advantages for both forms therefore, with or without the color screen, it is the intention to use a screen or not use it as dictated by the judgment of the user in view of the disclosure herewith.

Where further contrast is desired, red and green give good results for the same reasons that have led to the adoption of red and green for traffic lights, namely, the reliable distinction between the two and freedom from confusing with other lights. A red target and green water illumination have proved to be the most effective contrast found; with the result that the invention has been quite successfully operated with a red transparent target and a green screen, using incandescent electric lights the rays from which illuminate the red target and give to the water a very well defined green contrast.

It is desirable to diffuse the light from the incandescent lamps and this may be done readily, preferably by lightly frosting the lamp or by lightly frosting a surface of the screen or of the gauge glasses 23 and 24.

With the illustration of red and green given, the screen—or gauge glass—must be transparent to red rays and to such other rays as, intermixed with the red rays in the light, give the water its contrasting color. Commercial green glass satisfactorily performs these functions.

Red and blue have been found also to be good contrasting colors for average vision, the red being used preferably for the target and the blue for the screen. Many other contrasting colors have been tried, operating well from a technical standpoint but with poorer contrasting light effects than the colors named. For example, cobalt blue and violet, a blue target with a green screen, a blue target with a yellow screen, all give a contrast but the contrast is not nearly as satisfactory as that with the other colors named. One of the reasons why the red and green give the best contrast to be had appears to lie in the fact that the green transmits light of almost all the colors while the red transmits nothing but red.

Whatever the relation between the width of the slots in the casing and the width of the target, the contrast between the target and the water appears below the target as is clear in all of Figures 1–5. There may, however, be additional contrast of water showing at the side of the target if desired.

The target has been treated as transparent throughout the discussion to this point for the reason that this is the best form. Nevertheless some advantage from my invention may be gained using a target which is translucent merely and which is illuminated by the particular rays—as red—to which it responds. It is the intention to cover both.

In Figures 1, 2, 3 and 5 the target is hollow, i. e. tubular, while in Figure 4 the target is a solid glass or plastic form. If glass the tubular form is much to be preferred. A large size solid plastic, such as a phenol resin has a weight comparable with that of a glass tube. Considerable width of tubular target can be secured while controlling the target thickness to be penetrated by the illuminating rays to twice the tubular wall thickness. This permits fine control of the thickness because the wall thickness can be chosen to just that required for good results by the combination of wall thickness adapted to intensity of color and extent of illumination readily available. However, good results have been secured with considerable width of target using a solid target of circular cross-section.

A further advantage of the hollow target lies in the fact that free flow of water through the target is permitted when vertical movement of the target requires water flow.

In Figures 1, 2 and 5 the target is wider than the slots in the casing. As the target is central the water shows below the target and not elsewhere. In Figure 3 the target though approximately the width of the slots in the casing is not central with the result that the water shows at the side of the target as at 52. In Figure 4 the target 11' is central but is so narrow as to leave a contrasting water strip on each side at 52 and 52'.

In Figure 5 diagonal bars 53 are used across the open faces of the front and back slots so as to permit the use of a wider slot opening to show a wider target or to secure a stronger construction. It does not affect the application of my invention. Because the bars are diagonal, some part of the lower end of the target will show even when the lower end of the target lies directly back of one of the diagonal bars.

The form shown in Figures 9 and 10 is intended for use with boilers of relatively low pressures. The tube 11' is spring supported as in Figure 1. It is cylindrical and the casing is also approximately cylindrical. Because of this construction, it is convenient to use with it a curved screen 51' whenever a screen is used. The same capability of use of a colored gauge glass also as a screen instead of using a separate colored screen holds true here as in the other figures. Both can be used where each is intended to take out different rays or where one is intended to supplement the other.

It will be evident that it is quite desirable to free the target from opaque material as much as possible in order that the body of the target may transmit light of the characteristic target color through as large a proportion of the slot opening in the casing as is possible and as close to the visible water as possible. By suspending a long target from the top I secure a target body which is transparent from one side of the body to the other and gives a full showing of color. By extending the color clear to the bottom of the target the contrast with the water is heightened by the close adjacency of the water.

It will be evident that in normal use as a sight level indicator the target is completely surrounded by water, as distinguished from a target within a space having water below and steam in the upper part of the space.

It will be evident that a target such as that shown, having a length many times its diameter and contrasted with the water so that whatever the water level some part of the target will show its color through slot openings in the casing, makes the fact of high or low water level clear no matter what the height, as distinguished from a target which may disappear either above or below the slot opening range, rendering its position doubtful and without indication from the target itself as to whether the level be too high or too low.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. In an indicator for water level, a gauge having front and rear glass surfaces and adapted to receive water at boiler pressure, a float-supported transparent colored target suspended in said gauge from above, the target being hollow, of length many times its diameter and open at the top whereby with vertical movement of the target the water displaced flows through the hollow of the target, and colored to contrast with the color of the illuminated water.

2. In an indicator for water level, a gauge having front and rear glass surfaces and adapted to receive water at boiler pressure, a float-supported transparent colored target suspended in said gauge from above, the target being hollow and open at the top and of length comparable with its extent of movement, whereby with vertical movement of the target the water displaced flows through the hollow of the target, and colored to contrast with the color of the illuminated water, a diffusing screen, supported back of the gauge and a source of light containing the color of the target and in position to pass the light through the screen.

3. In an indicator for water level, a gauge having front and rear glass surfaces and adapted to receive water at boiler pressure, a float-supported transparent colored target suspended in said gauge and of length comparable with its range of movement, the target being hollow and open at the top, whereby with vertical movement of the target the water displaced flows through the hollow of the target, and colored to contrast with the color of the water, a filtering screen, walls holding the screen back of the gauge and a source of light containing the color of the target and in position to pass the light through the screen.

4. In an indicator for water level, a gauge having front and rear plate glass walls one of the walls being colored to act as a screen, a casing holding them in position, a colored target float-supported in said gauge, of length comparable with its range of movement and having a color different from the color of the screen means and means for transmitting light containing the color of the target through the plate glass surfaces and through the target.

5. In an indicator for water level, a gauge having front and rear plate glass walls, diffusion and color screen means, a colored target of length comparable with its range of movement float-supported in said gauge and having a color different from the color of the screen means and means for transmitting light containing the color of the target through the plate glass surfaces and through the target.

6. A float compartment comprising a casing, a float within the casing, a sight level gauge casing under the float connected with the first casing so as to maintain water in the gauge under pressure, a translucent target supported by its top from the float and extending into the gauge, the target being of length comparable with its range of movement, of tubular material, open throughout its length and of color sharply distinct from the color of the water and a source of light adapted to transmit light of the color of the target transversely through the gauge and through the body of the target.

7. In an indicator for water level, a spring support, a float carried and centered by the spring, a gauge having front and rear glass walls, the rear wall being colored to act as a screen, a transparent target float-supported within the gauge, of length comparable with its range of movement and of a color which the screen is adapted to pass, the spring, float, target and suspension being in movement free from sliding friction, and diffused light means for illuminating the target and water through the rear glass wall, said means containing the color of the target.

8. A gauge for indicating water level comprising a gauge body and having transparent walls adapted to pass light through the walls and through the interior of the body, a hollow colored indicator of length many times its over-all thickness and open at the top, whereby as the indicator is lowered the gauge content can pass vertically through the indicator, float means for suspending the indicator from the top and means for transmitting light the color of the target through the transparent walls.

9. In a gauge for indicating water level, a gauge body open at the front and back for passage of light therethrough, transparent front and back walls held to the body and adapted to maintain boiler pressure within the gauge, a transparent target of length comparable with its range of movement float-suspended from the top and open from bottom to top to allow passage of water therethrough, colored at the bottom of the target to contrast with the adjacent water showing through the gauge body and means for transmitting light containing the color of the target through the target and water from back to front.

10. A chamber column for upward connection into a float compartment and having front and rear transparent wall sections, a target between the transparent wall sections suspended from the top to show the height of a float in said compartment by the variant height of the target in the water within the column, the target in use including a downwardly extending tube of colored body transparent and opaque respectively to rays of different colors and in use permitting passage of light of its color through the body of the tube, and means including a color screen for rearwardly illuminating the target and water beneath the target by mixed rays of the said different colors whereby in front of the column the target and water illumined from the rear transmit contrasting colors forwardly.

11. In an indicator for water level, a gauge having front and rear glass surfaces and adapted to receive water at boiler pressure, a transparent colored target suspended in said gauge from a float, the target being hollow and open at the top, whereby with vertical movement of the target the water displaced flows through the hollow of the target, and colored to contrast with the color of the water, a color screen allowing passage of the color of the target and of a color illuminating the water in sharp distinction from the target, and means holding the screen back of the gauge.

12. In an indicator for water level, a gauge having front and rear plate glass walls, the rear wall being colored to act as a screen, a casing holding the walls in position, a tubular colored target float-supported in said gauge and having a color different from the color of the screen and means for transmitting light through the plate glass walls and through the target.

13. In an indicator for water level, a gauge having front and rear plate glass walls, the rear wall being colored to act as a screen, a casing holding the walls together, a tubular transparent glass target float-supported within the gauge and of a color which will pass through the rear wall, and diffused light means for illuminating the target and water through the rear glass wall, said means containing the color of the target.

14. In an indicator for water level, a gauge having front and rear plate glass walls, the rear wall being colored to act as a screen, a casing holding the walls together, a solid transparent target of a color adapted to be passed by the screen and different from the color of the water, float-supported within the gauge and diffused light means for illuminating the target and water through the rear glass wall.

15. A sight gauge for upward water connection into a float compartment having front and rear transparent gauge walls, a target extending downwardly into the gauge to show the height of the float by the variant height of the target and of the water below the target within the gauge, the target in use having a downwardly depending body at the bottom of material, transparent and opaque respectively to rays of different colors and means for rearwardly illuminating the target and the water downwardly adjacent the target by mixed rays of the said different colors, whereby viewed in front the target and water beneath the target are illuminated immediately above and below the bottom of the target to transmit light of contrasting colors, at the line of color change at the bottom of the target, with one color light-transmission above and another color light-transmission below providing the indicator of the gauge.

DAVID ROBERT YARNALL.